(12) United States Patent
Vukadinovic et al.

(10) Patent No.: US 10,141,832 B2
(45) Date of Patent: Nov. 27, 2018

(54) SYSTEMS AND METHODS FOR REDUCING SWITCH STRESS IN SWITCHED MODE POWER SUPPLIES

(71) Applicants: The Governing Council Of The University Of Toronto, Toronto (CA); Maxim Integrated Products, Inc., San Jose, CA (US)

(72) Inventors: Nenad Vukadinovic, Toronto (CA); Aleksandar Prodic, Toronto (CA); Cory Brent Arnold, Tempe, AZ (US); Brett A. Miwa, Wellesley, MA (US); Michael Warren Baker, Arlington, MA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 15/743,482

(22) PCT Filed: Jul. 11, 2016

(86) PCT No.: PCT/CA2016/000191
§ 371 (c)(1),
(2) Date: Jan. 10, 2018

(87) PCT Pub. No.: WO2017/008140
PCT Pub. Date: Jan. 19, 2017

(65) Prior Publication Data
US 2018/0205307 A1 Jul. 19, 2018

Related U.S. Application Data

(60) Provisional application No. 62/191,118, filed on Jul. 10, 2015.

(51) Int. Cl.
*H02M 1/088* (2006.01)
*H02M 1/14* (2006.01)
(Continued)

(52) U.S. Cl.
CPC ............ *H02M 1/088* (2013.01); *H02M 1/14* (2013.01); *H02M 3/158* (2013.01); *H02M 2001/0058* (2013.01)

(58) Field of Classification Search
CPC ........ H02M 1/088; H02M 1/14; H02M 3/158; H02M 2001/0058
See application file for complete search history.

(56) References Cited

U.S. PATENT DOCUMENTS

| 8,441,770 | B2 * | 5/2013 | Menegoli | H02H 9/001 361/144 |
| 9,985,473 | B2 * | 5/2018 | Mondal | H02J 9/062 |
| 2016/0318411 | A1 * | 11/2016 | Goetz | B60L 11/1809 |

* cited by examiner

*Primary Examiner* — Emily P Pham
(74) *Attorney, Agent, or Firm* — Lathrop Gage LLP

(57) ABSTRACT

In various embodiments described in the present disclosure, various methods and systems are introduced, that may reduce and/or eliminate the voltage spikes on the power switches by avoiding operation at zero-ripple duty ratios. In a first aspect, a method for reducing voltage spikes across switches in a multi-level converter is provided, the method comprising: receiving an error value associated with a difference between a measured output voltage and a reference output voltage; determining a target duty cycle value based at least on a control feedback loop adapted to minimize the error value; if the target duty cycle value is equal or approximately equal to one or more critical duty ratio values, controlling the operation of the multi-level converter to operate the multi-level converter with an averaging sequence, the averaging sequence adapted to, on average, result in, or sufficiently approximate, the one or more critical duty ratio values, but not operate at the one or more critical duty ratio values; and generating one or more pulse-width modulated signals to control the operation of the multi-level converter based on at least one of the target duty cycle and the averaging sequence.

20 Claims, 13 Drawing Sheets

(51) Int. Cl.
*H02M 3/158* (2006.01)
*H02M 1/00* (2006.01)

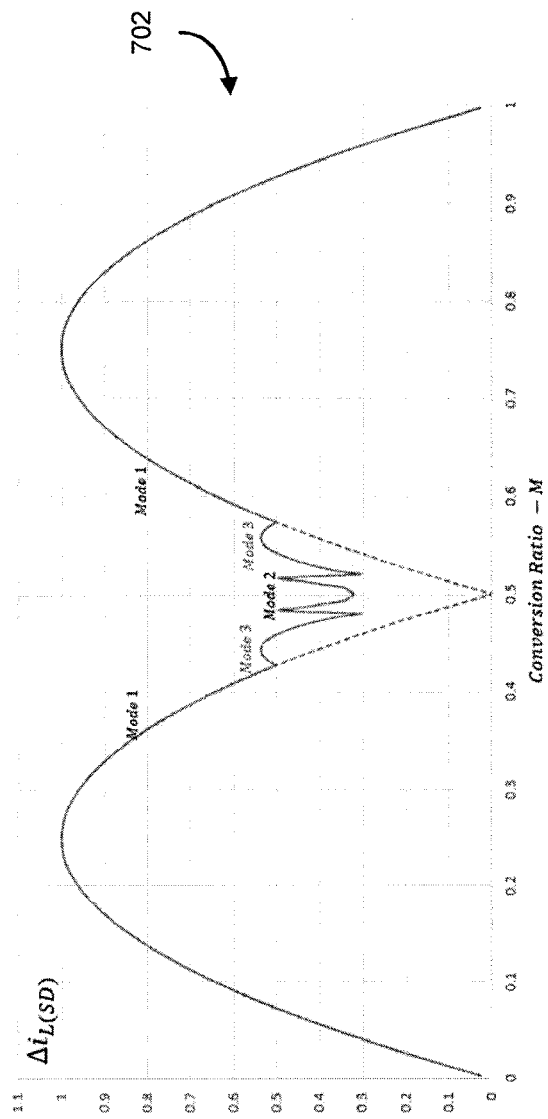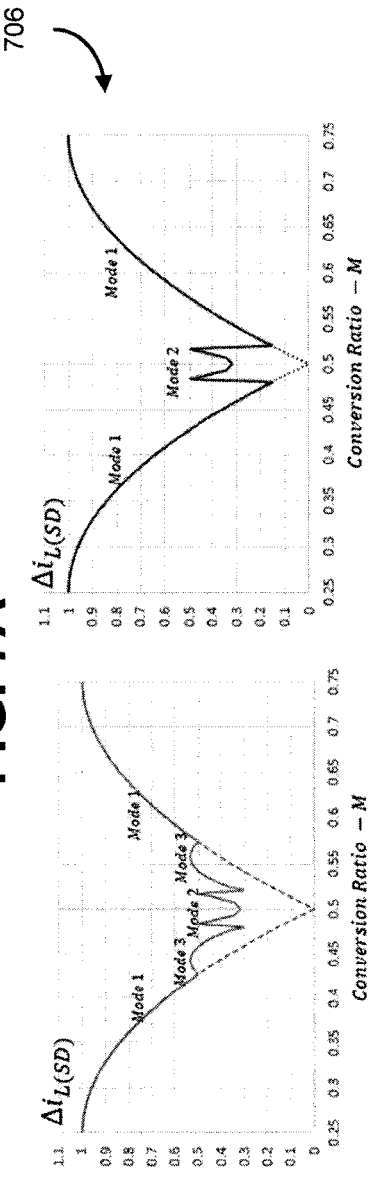
FIG. 7A
FIG. 7B
FIG. 7C

United States Patent US 10,141,832 B2

SYSTEMS AND METHODS FOR REDUCING SWITCH STRESS IN SWITCHED MODE POWER SUPPLIES

FIELD

The present disclosure generally relates to the field of power electronics and more specifically, the operation of switched mode power supplies.

INTRODUCTION

The operation of switched mode power supplies at particular operating points or at various operating characteristics may cause undesirable effects, including, for example, undesirable transient effects.

SUMMARY

In a first aspect, a method for reducing voltage spikes across switches in a multi-level converter is provided, the method comprising: measuring an output voltage of the multi-level converter; comparing the measured output voltage to a reference output voltage to process an error value associated with a difference between the measured output voltage and the reference output voltage; determining a target duty cycle value based at least on a control feedback loop mechanism adapted to minimize the error value; if the target duty cycle value is equal or approximately equal to one or more critical duty ratio values, controlling the operation of the multi-level converter to operate the multi-level converter with an averaging sequence, the averaging sequence adapted to, on average, result in, or sufficiently approximate, the one or more critical duty ratio values, but not operate at the one or more critical duty ratio values; and generating one or more pulse-width modulated signals to control the operation of the multi-level converter based on at least one of the target duty cycle and the averaging sequence.

In another aspect, a method for reducing voltage spikes across switches in a multi-level converter is provided, the method comprising: receiving an error value associated with a difference between a measured output voltage and a reference output voltage; determining a target duty cycle value based at least on a control feedback loop adapted to minimize the error value; if the target duty cycle value is equal or approximately equal to one or more critical duty ratio values, controlling the operation of the multi-level converter to operate the multi-level converter with an averaging sequence, the averaging sequence adapted to, on average, result in, or sufficiently approximate, the one or more critical duty ratio values, but not operate at the one or more critical duty ratio values; and generating one or more pulse-width modulated signals to control the operation of the multi-level converter based on at least one of the target duty cycle and the averaging sequence.

In another aspect, the control feedback loop mechanism is a proportional controller.

In another aspect, the control feedback loop mechanism is a proportional-integrative controller.

In another aspect, the control feedback loop mechanism is a proportional-integrative-derivative controller.

In another aspect, the multi-level converter is a three-level buck converter.

In another aspect, the one or more critical duty ratio values includes duty ratios where multi-level converters operate with at least one of zero voltage and current ripple.

In another aspect, the one or more critical duty ratio values includes only 0.5.

In another aspect, the one or more critical duty ratio values includes, for an N-level converter, any duty ratio having the form $i/(N-1)$, where i is an array from 1 to N-2.

In another aspect, the one or more critical duty ratio values includes at least one of 0.25, 1/3, 0.5, 2/3, and 0.75.

In another aspect, a system adapted for reducing voltage spikes across switches in a multi-level converter is provided, the system comprising: a first unit configured to measure an output voltage of the multi-level converter; a second unit configured to compare the measured output voltage to a reference output voltage; a third unit configured to control the operation of the multi-level converter to operate the multi-level converter with an averaging sequence, the averaging sequence adapted to, on average, result in, or sufficiently approximate, one or more critical duty ratio values, but not operate at the one or more critical duty ratio values, wherein the averaging sequence is based at least on an error value determined at least in part by the difference between the measured output voltage and the reference output voltage.

In another aspect, a system adapted for reducing voltage spikes across switches in a multi-level converter is provided, the system comprising: a unit configured to control the operation of the multi-level converter to operate the multi-level converter with an averaging sequence, the averaging sequence adapted to, on average, result in, or sufficiently approximate, one or more critical duty ratio values, but not operate at the one or more critical duty ratio values, wherein the averaging sequence is based at least on an error value determined at least in part by the difference between the measured output voltage and the reference output voltage.

In another aspect, the system is implemented using field programmable gate array (FPGA) technology.

In another aspect, a method for providing a duty cycle avoidance switching sequence is provided that, on average, results in one or more desired duty ratios or one or more general input control variables corresponding to one or more critical operating points.

In another aspect, the method is further adapted to maintain proper output voltage regulation, flying capacitor balance, and symmetry of the inductor current waveform.

In another aspect, the switching sequence is configured to ensure a symmetric ripple.

In another aspect, a multiple mode controller is provided that, for operating points substantially different from zero-ripple operating points, operates as a conventional controller, while in the vicinity of the zero-ripple operating points, operates using a duty cycle avoidance mode, and includes one or more modes adapted for smooth frequency/ripple transitions between conventional and avoidance modes of operation.

In another aspect, the multiple mode controller is adapted to operate in a duty ratio avoidance mode when a desired duty ratio is, between a first duty ratio and a second duty ratio, and is adapted to operate in a different mode when the desired duty ratio is beyond the range provided between the first duty ratio and the second duty ratio.

In another aspect, a system configured for operating point avoidance is provided, the system comprising: a digital pulse-width modulator; a critical duty cycle avoidance control logic unit for, upon detecting that a desired duty ratio value is near or equivalent to one or more critical duty ratio values, controlling the digital pulse-width modulator to operate an averaging sequence, the averaging sequence adapted to, on average, result in, or sufficiently approximate, the desired duty ratio, but not operate at the one or more critical duty ratio values such that the one or more critical operating points are avoided.

In another aspect, the converter is further configured to correct for variations in at least one of gate drive delays, level shift delays, and real-world circuit implementation non-idealities to achieve the desired duty ratio with non-overlapping switch operation. Many further features and combinations thereof concerning embodiments described herein will appear to those skilled in the art following a reading of the instant disclosure.

In another aspect, the method further includes conducting an automated circuit analysis to identify the one or more critical duty ratio values.

In another aspect, the automated circuit analysis includes simulating the multi-level converter and approximating the one or more critical duty ratio values based at least on a number of levels in the multi-level converter.

In another aspect, the automated circuit analysis includes processing of historical control information stored in a non-transitory machine-readable medium wherein the one or more critical duty ratio values are identified through approximations based at least on one of: circuit response, input characteristics, output characteristics, control parameters, and operating parameters.

In another aspect, generating the one or more pulse-width modulated signals includes generating control signals provided to four switches within the multi-level converter, the control signals controlling the switches to change states in accordance with the averaging sequence.

In another aspect, the averaging sequence provides for dead-time adjustment during the operation of the multi-level converter when then the target duty cycle value is equal or approximately equal to one or more critical duty ratio values, thereby reducing a requirement for simultaneous control and reducing a number of shoot-through paths.

In another aspect, the one or more pulse-width modulated signals are configured to issue simultaneous control signals to up to two switches of the four switches.

In another aspect, the averaging sequence is configured to, during a first half of a switching cycle, change a switching node voltage from 0 to $V_{IN}/2$, and during a second half of the switching cycle, change the switching node voltage from $V_{IN}/2$ and $V_{IN}$.

In another aspect, one or more dead-band regions are applied around each of the one or more critical duty ratio values, and wherein when the desired duty ratio falls within one of the one or more dead-band regions, the averaging sequence is applied or used to control the multi-level converter.

In another aspect, the averaging sequence, during operation in the one or more dead-band regions, is adapted for provisioning a transition smoothing mode wherein the switching frequency is gradually reduced from $f_s$ to $f_s/2$.

In another aspect, the size of the one or more dead-band regions is determined based at least on a maximum allowable ripple.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 7, where the inductor current ripple for a potential system and a conventional 3-level buck converter are shown, according to some embodiments.

FIGS. 7A, 7B and 7C provide three different plots illustrating the dependence of the normalized inductor current on the conversion ratio value for critical duty cycle avoidance modulation, as provided across various modes of operation, according to some embodiments.

DETAILED DESCRIPTION

Figure 1:
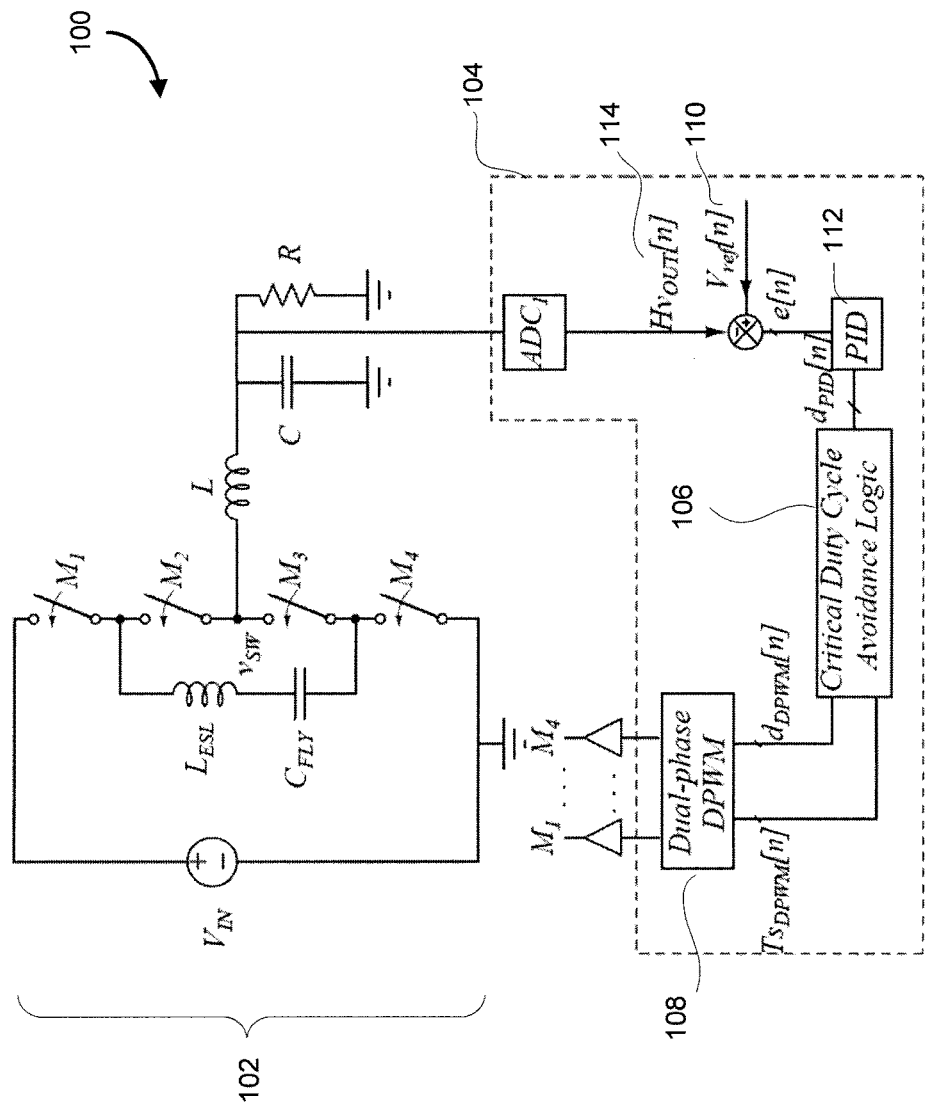
FIG. 1 is a circuit schematic diagram of a three-level buck converter regulated by a critical duty cycle avoidance ratio digital controller, according to some embodiments.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In some embodiments, various methods, systems, and non-transitory computer-readable media are described for the control of various characteristics of the operation of a switch-mode power supply (SMPS) such that critical operating points are avoided (e.g., a "skip duty" control).

The control of the various characteristics can be performed, for example, using a digital control-based method and/or system, and in some embodiments, performed using various computing devices, or various control feedback systems. The control methods and/or systems can be used, for example, to provide control in relation to the operation of existing infrastructure. In some embodiments, a digital voltage-mode pulse width-modulated (PWM) controller may be configured to provide such control. In some embodiments, analog implementation may also be provided. In some embodiments, a possible implementation can be provided through mixed-signal control using current programmed mode control.

The control systems and methods of the present disclosure may be utilized in controlling the operation of multi-level (e.g., multi-stage) converters, such as three-level buck converters, etc. There may be more, other types of levels, etc., and different types of converters (e.g., a step up converter).

In various embodiments described in the present disclosure, various methods and systems are introduced that may reduce and/or eliminate the voltage spikes on the power switches by avoiding operation at zero-ripple duty ratios. Some potential benefits may also be provided, for example, output voltage regulation, flying capacitor balance, and symmetry of the inductor current.

As an example, an operating point avoidance control method is described for use with a 3-level converter, avoiding operation of the converter at exactly D=0.5, and instead creating a switching sequence that over 2 cycles that effectively provides the desired average duty ratio. The operation of the system may be extended for converters with lower and/or higher number of levels. The effectiveness of the operating point avoidance control approach has been demonstrated with an experimental prototype, showing reduction and/or elimination of the undesirable voltage spikes and allowing utilization of switches with reduced voltage ratings. Accordingly, the methods and systems described may be beneficial in helping obtain some of advantages that multi-level converters have to offer.

In some embodiments, the control method is provided in the form of a device or machine that is configured for providing operating point avoidance control. For example, such a device or machine may be configured to implement and/or drive specific control mechanisms that are timed and/or responsive to events and/or selected values of D. The control mechanisms can be provided through the issuance, generation, and/or provisioning of specifically invoked electrical and/or mechanical control signals that may be received by components that change the operating state of the components (e.g., diodes, switches).

In some embodiments, the control method embodied in the device or machine is provided in the form of a special purpose machine (e.g., configured electrical circuits including gates) that utilizes specially configured components as provided, for example, in FIG. 1. In some embodiments, the control method is provided as a system or a kit wherein the physical electrical components being controlled and/or the circuit are provided as a package. For example, a specific circuit may be provided such that the circuit provides potentially advantageous conversion properties in relation to avoiding conventional issues related to critical duty cycle values, the specific circuit being provided as an electrical component or package that can be utilized in, for example, applications wherein reduced size (e.g., as driven by a reduction in the required inductance), is desirable. As noted below, the critical duty cycle avoidance circuit may provide its advantages with potentially less switching losses than, for example, simply increasing a switching frequency.

FIG. 1 is a circuit schematic diagram of a three-level buck converter regulated by a critical duty cycle avoidance ratio digital controller, according to some embodiments.

In SMPS for space constrained applications, cost-effective implementation and high power processing efficiency may be relevant factors for consideration. In these applications, including mobile devices, consumer electronics, and other electronics equipment, a significant portion of the overall device volume may be occupied by the inductors of step down or step up SMPS supplying various functional blocks. As such, the characteristics (e.g., size, cost) of the inductors may be a significant obstacle for further miniaturization of numerous devices. A potential solution for the reduction of reactive components (primarily inductors) is increasing the switching frequency. A drawback of this potential solution is that the switching losses are often increased, leading to lower efficiency and increased cooling requirements, which can nullify the obtained advantages.

Alternative solutions for volume reduction, based on the replacement of traditional buck converters with different topologies, may be utilized. Those solutions include switched capacitor (SC) converters, which completely eliminate inductors and, in many of the targeted applications, result in much higher power density. However, the SC converters may present deficiencies such as suffering from large drops in power processing efficiency for conversion ratios that are not fixed. Thus, in applications where a wide conversion ratio range is required, their use may be limited.

Multi-level converters (for example, the converter of FIG. 1), may present an attractive alternative to the conventional buck or boost based topologies. The multi-level converters may allow for a significant reduction of the inductor size, improved power processing efficiency, and operation over a wide range of conversion ratios without significant efficiency variations.

Even though the advantages of multi-level converters have been recognized, they have not been widely adopted. A potential reason may be due to the fact that some failure mechanisms related to transient voltage stress across the switches, especially at certain operating points, have not been fully recognized and due to the lack of hardware-efficient cost-effective solutions for the same.

For example, conventional controllers for multi-level converters may include three components, a block that measures the output voltage and compares it with a reference (desired) value, a block that processes that error and sends a control signal (usually a PI or PID compensator), and a block that takes that control signal and creates a pulse-width modulated signal. What is characteristic for these control methods is that at the end, they will produce signals of the same duty ratio for a given input and output voltage. However, there may be issues faced when multi-level converters operate around critical points (e.g., a 50% duty ratio).

In some embodiments, there may be various critical operating points, for example, for a multi-level converter, one or more critical duty ratios may be calculated wherein any duty ratio having the form $i/(N-1)$ where [i] is an array from 1 to $N-2$ may be a critical operating point. These values may, for example, be varied by various non-idealities, etc., and the values may be exact, and/or approximate across a range. For instance, for a 3-level converter, there may be a critical duty ratio at 1/2, for a 4-level converter, there may be critical duty ratios at 1/3, 2/3, and for a 5-level converter, critical duty ratios at 1/4, 1/2 and 3/4, etc.

In some embodiments of the present disclosure, several further components may be provided in relation to controllers that mitigate and/or address some deficiencies with multi-level converters. For example, a first block may be provided that, by looking at the information available in the control loop, the block will recognize critical points (for example 50% duty ratio for a 3-level buck), and a second block may be provided to generate and/or otherwise cause an averaging sequence that will, in average, result in the 50%, i.e. critical duty ratio value, but will never actually operate at that value. The recognition of critical operating points may, for example, be based on an analysis of the number of levels of the converter.

For example, the further components described above may combined to provide a critical duty cycle avoidance ratio digital controller that is configured to address some of the deficiencies (e.g., those related to transient voltage stress across the switches, especially at certain operating point and/or certain conversion ratios), and to provide a control-based mechanism to overcome and/or mitigate the effects of at least some of the deficiencies.

In some embodiments, the controller addresses excessive and/or damaging voltage spikes caused by $L_{ESL}$, the equivalent series inductance (ESL) of the flying capacitor, $C_{FLY}$, at zero-ripple operating points, and shows a control-based solution for the same.

The controller may be configured to avoid one or more critical duty ratios while being configured for various characteristics, such as maintaining tight output voltage regulation.

Some embodiments of the controller may also provide simplified non-overlapping time adjustment, which, at the critical operating points, would otherwise be much more complex than that of the other converters.

The controller may be configured to operate such that the operating point avoidance does not affect symmetry of the inductor current waveform.

While FIG. 1 illustrates a controller 104 being adapted for use with a three-level buck converter case, the three-level buck converter 102 is provided only as an illustrative example, and the controller (and/or its control principles) may be applied to other topologies and/or configurations (e.g., step-up configurations), and to converters with a different (e.g., larger. smaller) number of levels.

In some embodiments, the controller 104 may be adapted for use with various types of circuit where a particular operating point or points may yield undesirable operating characteristics. The controller 104, in these embodiments, would then be configured to utilize various control methods and/or principles such that the operating points can be avoided and/or "skipped". The controller 104 may be comprised of a PID controller 112 (but may also be a PID controller, but may also be a P controller, a PD controller), which receives inputs such as reference voltage 110, and detected output voltage 114. The critical duty cycle avoidance logic unit 106 is utilized to provide generate various control signals that are utilized in providing various operating sequences for the various switches of the converter 102, through, for example, dual phase digital pulse width modulator (DPWM) 108.

The critical duty cycle avoidance unit 106 may be configured to recognize conditions in the circuit, (e.g., if the converter operates sufficiently close to critical point, for example, in a pre-defined region or within a pre-defined threshold), and, accordingly, adjusts the switching sequence based on one or more determinations. For example, the critical duty cycle avoidance unit 106, upon recognizing an approach to or a desired operation at (or near) one or more critical points of operation, the critical duty cycle avoidance unit 106 may then generate, produce, and/or implement a sequence that, in average, results in the critical point but, does not issue that critical value directly. There may be various types of sequences provided, such as sequences configured to provide other types of operating characteristics, such as a symmetric ripple. A determination of critical values may include a computation in relation to the type of converter, monitored circuit information obtained via direct and/or indirect measurements, pre-defined information (e.g., external input via a computing device, hard-coded values, soft-coded values), etc. As noted throughout the specification, the critical values of duty ratio for operation may vary depending on factors such as type of circuit, the type and characteristics of selected components, and the presence and/or absence of various non-idealities, including parasitics.

The critical duty cycle avoidance logic unit 106 receives signals from the PID controller 112 but, where desired operation is determined to be near and/or on a critical operating point, the critical duty cycle avoidance logic unit 106 may be configured to implement one or more different operating modes having different operating sequences. The critical duty cycle avoidance logic unit 106 may, for example, issue various control signals to the switches in accordance with various operating sequences as described further in this specification.

The control signals M1-M4 correspond to switches M1-M4 of converter 102, and these signals may be considered input control variables, that may, for example, be provided directly or indirectly to the converter 102.

The switch sequence may be adapted such that certain critical operating points can be avoided and/or "skipped" in controlling operation of the converter 102, and the sequence may also be adapted such that the duty cycle values, on average, result in a desired duty cycle value, even if the desired duty cycle value falls on a critical operating point.

Overview of Multi-Level Dc-Dc Converters and Voltage Stress at Certain Operating Points A potential advantage of multi-level DC-DC converters, over some other topologies is that the multi-level converters may be configured to provide for a significant reduction of the inductor value without increasing switching losses. In multi-level converters, the inductor voltage swing may, for example, be reduced by N−1 times, where N indicates the number of levels. In addition, for the same number of switching actions of an individual switch over one switching period, the ripple frequency may be increased by N−1 times. Combined, these benefits may allow for a reduction of the inductor value.

Figures 2A, 2B, 2C:
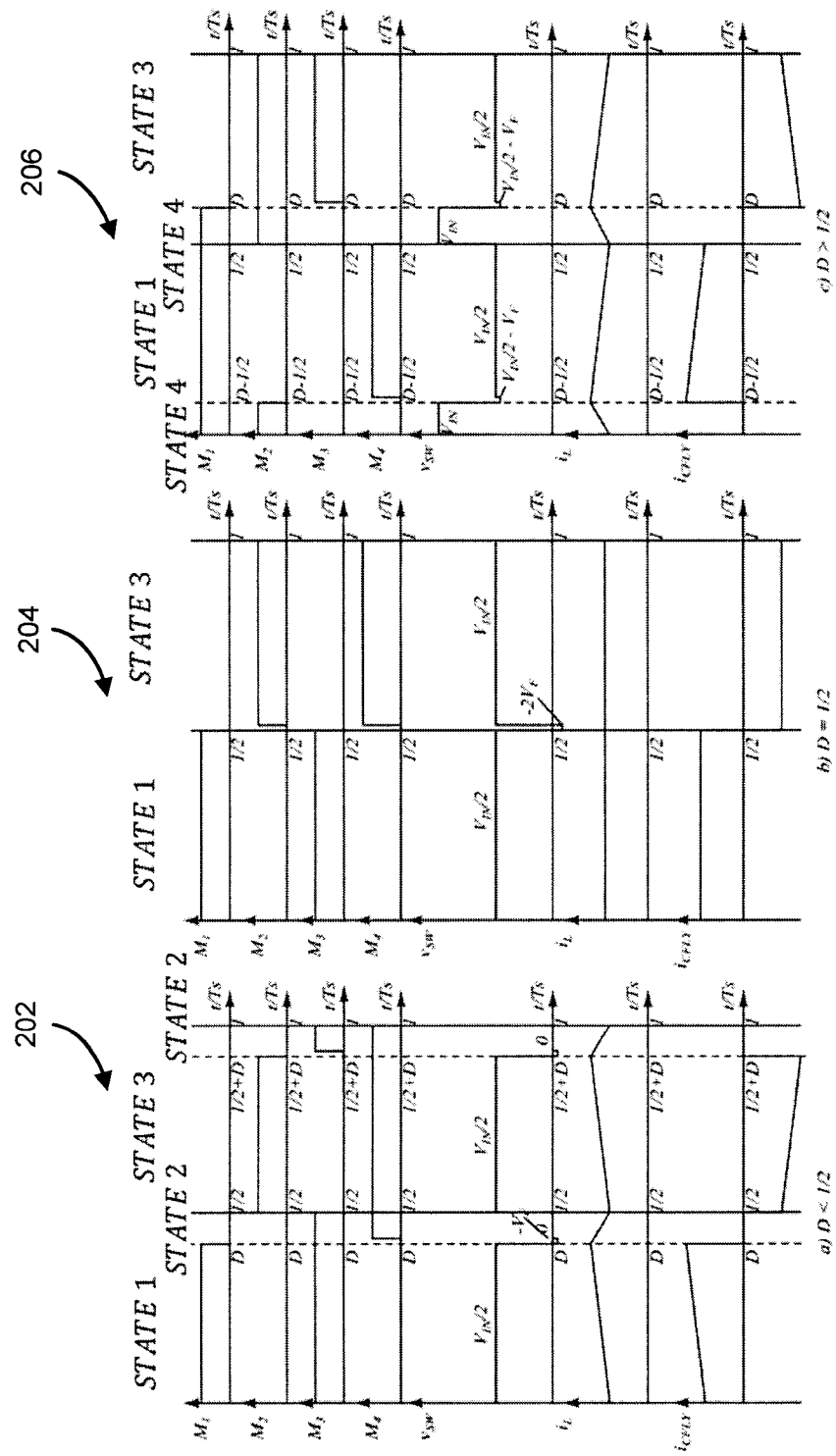
FIGS. 2A, 2B, 2C and 2D are various waveform diagrams provided in relation to a 3-level buck converter for various values of duty cycle (D), according to some embodiments.

Furthermore, for a three-level converter, with key steady-state waveforms and equivalent circuit configurations for various duty ratio values as shown in FIGS. 2A-2C and FIGS. 3A-3D, respectively, the voltage stress across all the switches is, ideally, reduced by a half. FIGS. 2A, 2B and 2C are various waveform diagrams provided in relation to a 3-level buck converter for various values of D: M1 to M4—states of switching transistors (high indicates on-state), $v_{sw}$—inductor switching node voltage, $i_L$—inductor current, and $i_{CFLY}$—current of the flying capacitor, according to some embodiments. FIGS. 3A, 3B, 3C, and 3D are circuit schematic diagrams of illustrating equivalent circuits of the 3-level converter for four switching states, according to some embodiments.

One potential deficiency with multi-level converters is that in a realistic converter, at certain operating points, the voltage stress across the transistors during switching transitions can be higher, due to the parasitic equivalent series inductance $L_{ESL}$ of the flying capacitor $C_{FLY}$. This excessive voltage stress can damage transistors and, since it occurs at a single operating point of the converter, is usually noticed in the form of sporadic voltage spikes at the switching node.

Signal waveforms for an ideal three-level converter are shown in FIGS. 2A-2C; and equivalent circuits that also include $L_{ESL}$ are shown in FIGS. 3A-3D. It can be seen that for D<0.5 and D>0.5, the converter passes through states where, during a half of the switching cycle, the flying capacitor $C_{Fly}$, whose voltage is kept at an approximate constant voltage $V_{IN}/2$, is charged or discharged by the output filter inductor L, and that this portion of the period is always followed by another, during which no current flows through the flying capacitor.

Figure 2D:
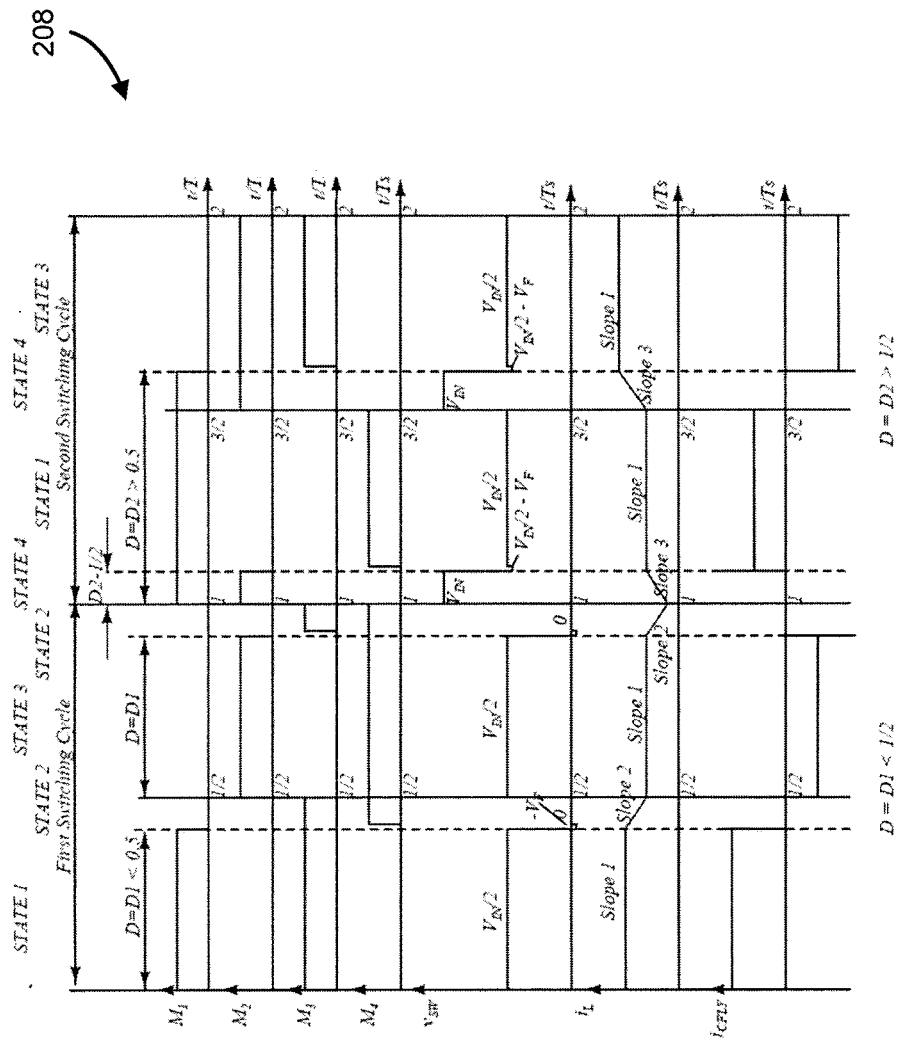
Figures 3A, 3B, 3C, 3D:
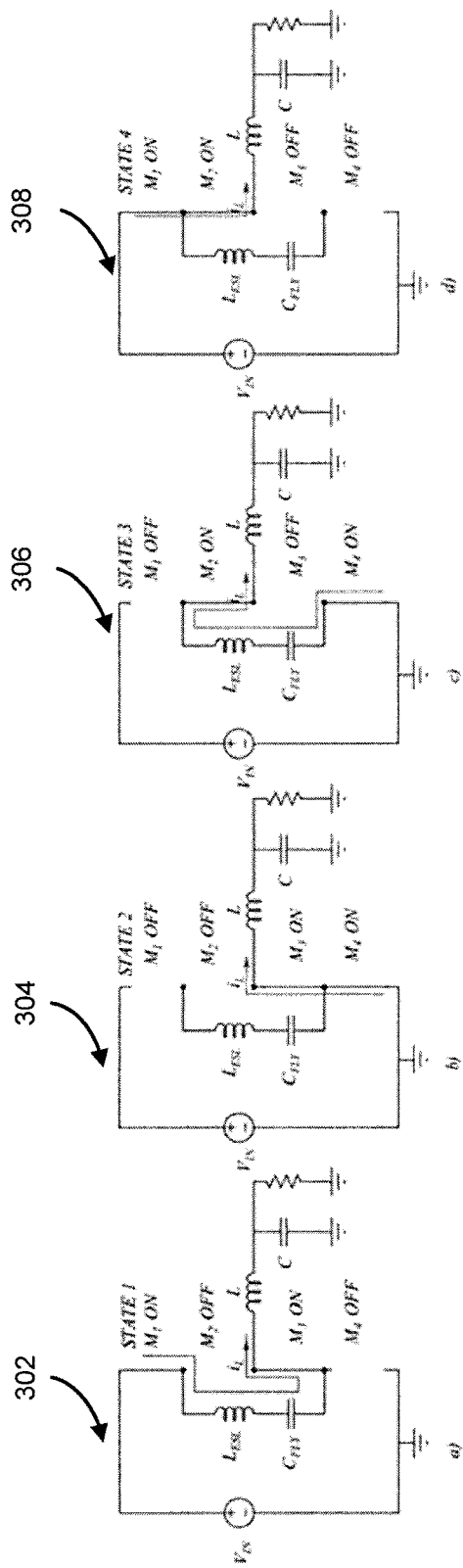
FIGS. 3A, 3B, 3C, and 3D are circuit schematic diagrams of illustrating equivalent circuits of the 3-level converter for four switching states, according to some embodiments.

Accordingly, in a realistic converter, for D<0.5 and D>0.5, during each cycle the current of $L_{ESL}$ changes from $-I_L$ to $+I_L$, passing through zero current intervals (state 2 or state 4 of FIG. 2 and FIG. 3). During these transitions, only two out of four transistors change their states during the switching instants.

The portions of periods during which there is no current passing through $L_{ESL}$ may allow for adjustment of non-overlapping times in a similar manner as for the conventional buck, since only two switch transitions occur at that time. In other words, sudden changes of $L_{ESL}$ current (from $+/-I_L$ to 0A) may affect voltage ringing at the switching node in the same way that parasitic inductance in series with high-side or low side switch of a conventional buck converter affects its switching nodes, since its currents are also changing from $+I_L$ to 0A. Possible ringing at the switching node due to this effect may be a problem.

Operation of the Converter Around Zero-Ripple Region

FIGS. 2A-2C and FIGS. 3A-3D indicate that when D is approaching 0.5, i.e. the converter operates close to a zero-ripple region, the states 2 and 4, where $L_{ESL}$ current is equal to zero, are becoming shorter, while at D=0.5 this current is changing from $+I_L$ to $-I_L$, as shown in FIG. 2B.

At this point, the time available for releasing the energy stored in $L_{ESL}$ may practically be zero. Accordingly, the parasitic inductance may have a larger impact on the switching node voltage, as $L_{ESL}$ current discontinuity is affected twice as much as in the regular case (e.g., a non-critical operating point) because the current instantaneously changes from $$i_{L_{ESL}}(t=T_s^-/2)=I_L+\Delta i_L=I_L$$

to $$i_{L_{ESL}}(t=T_S^+/2)=-I_L-\Delta i_L=-I_L, \quad (1)$$

where $I_L$ is the dc current of the output filter inductor and $\Delta i_r$ the inductor current ripple, which at the critical point is equal to zero. This sudden change in the parasitic inductance energy may cause large voltage spikes at the switching node.

In other words, at the critical point, the converter behaves quite differently from other points. At other points (e.g., non-critical operating points) the operation of the multi-level converter is similar to the regular, i.e. 2-level converter.

Another issue with critical operating points is that four switching transitions are happening at the same time, as it can be seen from FIGS. 2A-2C and FIGS. 3A-3D. $M_1$ is changing from the ON state to the OFF state, and $M_2$ from OFF to ON, while their synchronous pairs $M_3$ and $M_4$ are also changing states. This implies that setting the dead-time at this point is becoming more challenging, since firstly $V_{IN}/2$ voltage has to be continuously maintained at the switching node and, more importantly, shoot-through conditions have to be avoided.

Shoot-through conditions exist when at least one of the following short circuit paths exist: $V_{IN}$ to $V_{CFLY}$ ($M_1$, $M_4$—ON), $V_{CFLY}$ to GND ($M_2$, $M_3$—ON), and $V_{IN}$ to $V_{CFLY}$ to GND ($M_1$, $M_2$, $M_3$ and $M_4$ all in the ON state). FIG. 2B shows waveforms of the ideal converter for the case when all four switches are turned off during non-overlapping periods, ideally causing the body diodes of low side switches $M_1$ and $M_4$ (not shown in the diagrams) to conduct through the output filter inductor and cause a voltage drop of $-2V_F$.

Zero-Ripple Operating Point Avoidance Control Method and System Duty Cycle Modulation and New Conversion Ratio To mitigate, eliminate, and/or otherwise address various challenges associated with operation around various operating points (e.g., the zero-ripple (D=0.5 in the previous 3-level buck converter example) operating point), a control method and/or modulation method may be described in various embodiments. For example, the control method and/or modulation method may be considered for zero-ripple operating point avoidance control and modulation.

The control method may be provided to reduce, mitigate, and/or eliminate sudden changes of the flying capacitor current between $+I_L$ and $-I_L$ by avoiding one or more zero-ripple points. In some embodiments, the control method may be adapted such that control may be provided without compromising the effective converter conversion ratio or creating a flying capacitor imbalance.

A potential benefit of this control method may be that the control method provides convenient non-overlapping dead-time adjustment, reducing and/or otherwise eliminating the need for simultaneous control of four switches and reducing the number of shoot-through paths. The need to control all four switches comes from the way the 3-level converter operates. At duty ratios lower than a critical operating point (e.g., 0.5) and larger than a critical operating point (e.g., 0.5), all four switches are controlled but not at the same time. However, at a critical operating point (e.g., 0.5) all of the switches are triggered at the same time.

As a further example to provide a comparison with conventional modulation; when conventional modulation is used, the converter may operate at exactly D=50% duty ratio achieving 50% of conversion ratio. At that point, four switching transitions (actions) may be occurring at the approximately same time M1 (ON->OFF), M2 (OFF->ON), M3 (ON->OFF), M4 (OFF->ON). Simultaneous control of all four switches is thus required.

In some embodiments described herein, only two switching transitions may be required at a particular timeframe and a potential benefit may be that simultaneous control of all four switches may not be required (rather, only two switches may need to be controlled).

Figure 4:
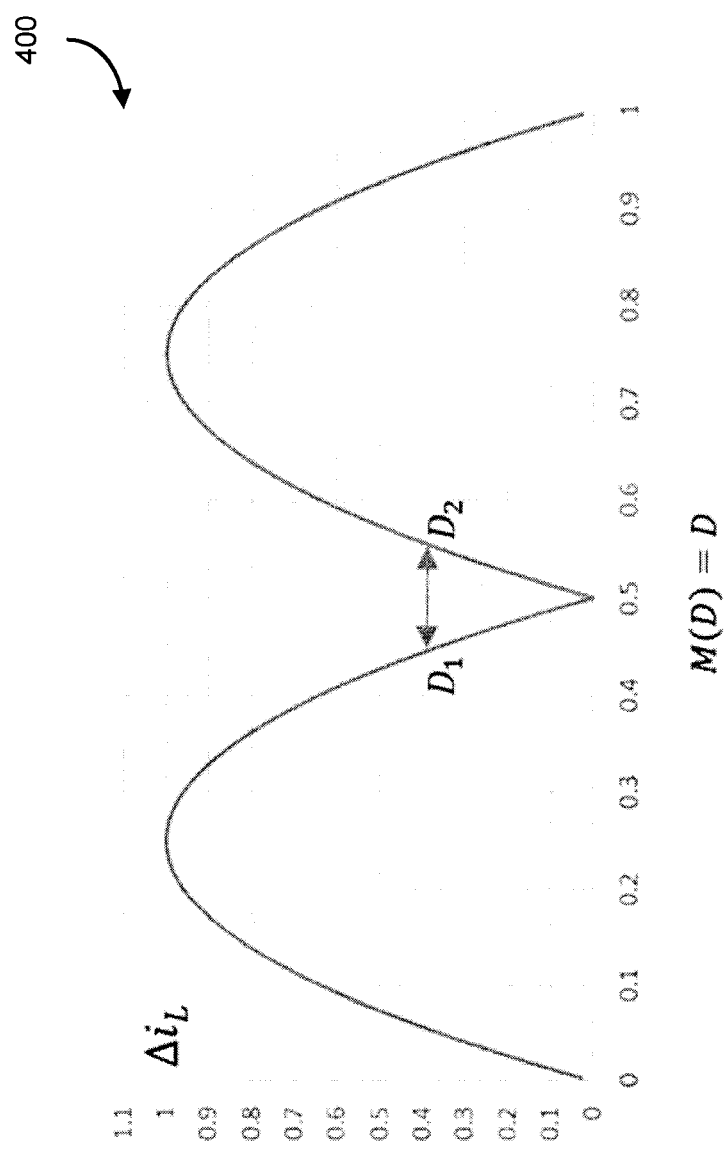
FIG. 4 is a chart plotting the normalized inductor current ripple on conversion ratio M(D)=D, according to some embodiments.

FIG. 4 is a chart plotting the normalized inductor current ripple on conversion ratio M(D)=D, according to some embodiments. FIG. 4 may be helpful in illustrating one or more principles relating to a modulation method and/or system, according to some embodiments.

In order to avoid operation at D=0.5 (e.g., but where a step down conversion ratio of 0.5 is required), the converter may be configured to provide controlled operation of the converter. In some embodiments, the convert is configured to operate in a mode that can be viewed as alternating between two slightly different values of duty cycle which, on average, result in the desired step down ratio value. These two values are marked $D_1$ and $D_2$ in FIG. 4, where $D_1$<0.5 and $D_2$>0.5.

In some embodiments, a simple sequential combination of applying the two duty ratio values over two switching cycles and alternating between them may not be optimal, since as it can be seen from FIG. 2A and FIG. 2C that this approach may potentially result in a non-symmetric inductor current ripple. For example, a simple sequential combination of applying the two duty ratio values over two switching cycles and alternating between may lead to the "merging" of the waveforms as depicted in FIG. 2A (where D<0.5–D1 for instance equal to 0.45=45%) and FIG. 2C (D>0.5–D2 for instance equal 55%). In another words, it may not be optimal to provide D1 in first switching period and D2 in the second switching period. In attached FIG. 2D, an example plot is provided to illustrate the shape of the inductor current if the system applies D1 over first switching cycle and D2 over second switching cycle.

Figure 5:
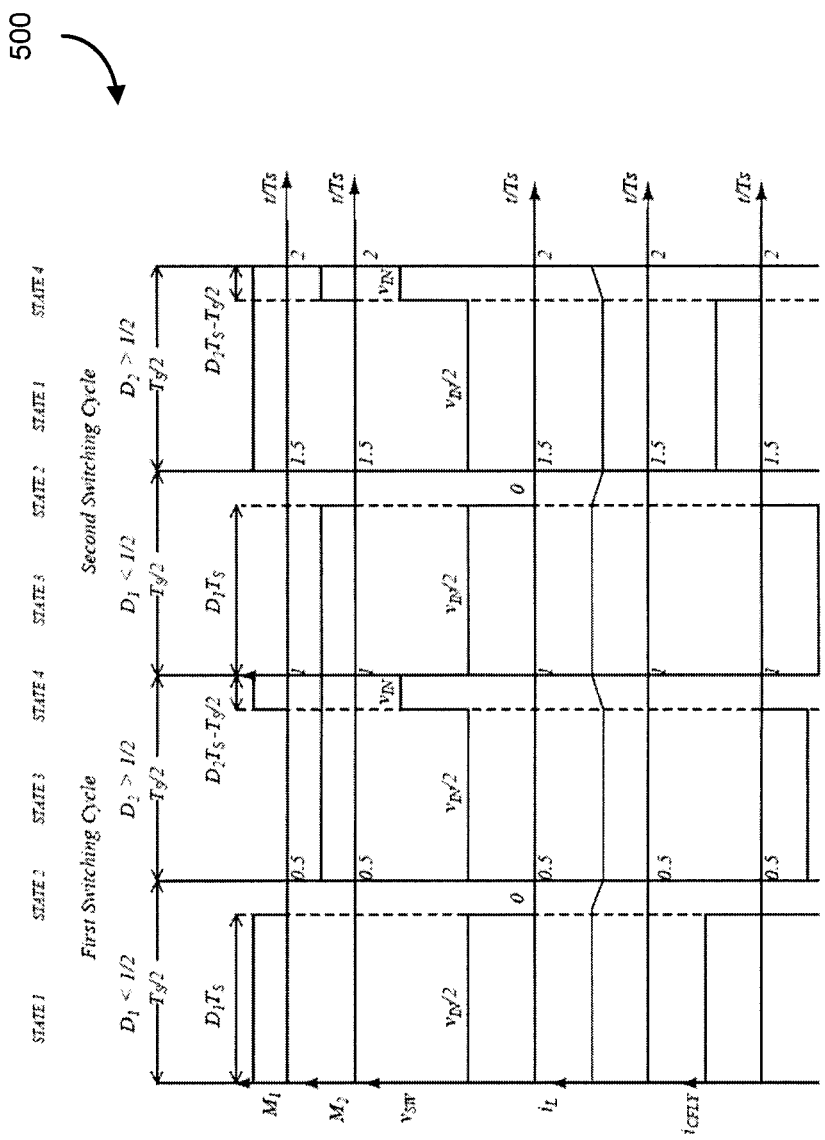
FIG. 5 is a waveform diagram illustrating a modulation method, according to some embodiments.

In some embodiments, the controller may be configured to provide a sequence that may address some of these deficiencies. In an example sequence, D1 may be applied in the first half of the first switching cycle, D2 in the second half of the switching cycle and to repeat that sequence in the second switching cycle. See for example, the plot of FIG. 5 (or 500), where the system may be configured to repeat that sequence in the second switching cycle in order to balance the flying capacitor, such that average current is equal to 0). FIG. 5 is a waveform diagram illustrating a modulation method, according to some embodiments. The modulation method of FIG. 5 may be defining a switching sequence such that the non-symmetric ripple is reduced and/or eliminated, but still, all 4 states characteristic for successive application of the $D_1$<0.5 and $D_2$>0.5 switching sequences are applied over two switching periods.

As noted in FIG. 5, slope 1=$(V_{in}/2 - V_{out}/L)$=0; slope 2=$-V_{out}/L$=$(-V_{in}/2)/L$, slope 3 =$(V_{in}-V_{out})/L$; and for all three slopes averaged over two switching periods of the $V_{out}$=$V_{in}/2$ since FIG. 5 depicts a sample conversion ratio of 1/2.).

In other words, in some embodiments, instead of having value $D_1$ (resulting in switching node variations between 0 and $V_{IN}/2$) applied in the first switching period and value $D_2$ (resulting in switching node variations between $V_{IN}/2$ and $V_{IN}$) applied in the second switching period, the switching sequence may be modified such that the symmetric inductor current and ripple at effectively a two times higher frequency are obtained.

In some embodiments, during the first half of the switching period, the switching node voltage $v_{sw}$, changes its value from 0 to $V_{IN}/2$ and, during the second half of the switching cycle, the switching node voltage changes values from $V_{IN}/2$ to $V_{IN}$.

Sample equations for the output filter inductor volt-second balance (VSB) and the flying capacitor charge-second balance (CSB) may be indicated as:

$$\langle v_{out}\rangle_{2Ts} = \langle v_{sw}\rangle_{2Ts} = \frac{V_{in}}{2}(D_1 + D_2); \text{ and} \qquad (2)$$

$$\langle i_C \rangle_{2Ts} = I_L D_1 + I_L(0.5 - D_2 + 0.5) - I_L D_1 - I_L(0.5 - D_2 + 0.5) = 0$$

The VSB equation may indicate that output voltage may depend on values $D_1$ and $D_2$, and only when $D_1$ and $D_2$ are at equal distances from operating point D=0.5 will the output voltage be exactly equal to the half of the input voltage.

The CSB equation shows that, ideally, balancing of the flying capacitor may be achieved for any values of $D_1$ and $D_2$, and does not depend on them being equal distances from the D=0.5 operating point, as long as the skip modulation is applied over two switching cycles.

Accordingly, in some embodiments, modulation of $D_1$ relative to $D_2$ can be used for providing conversion ratios in the vicinity of the zero-ripple operating point, and by having independent control of values of $D_1$ and $D_2$, charge balancing and output voltage regulation can be achieved independently.

In some embodiments, the controller may be configured for the control of one or both of $D_1$ and $D_2$, such that skip modulation is applied having various characteristics. The values can be modulated against one another, and controlled independently or in conjunction. The values may be selected such that there is charge balancing and/or output voltage regulation.

As an example, a general switching sequence for a conventional convertor may be provided where the converter needs to produce a 50% duty ratio, the converter is configured to keeps two transistors on for a 50% of a switching period and during the remaining portion of the switching period keeps the same two transistors off.

An alternate control sequence may include, for example, keeping those two transistors on for 45% of the time and keep them off for the 55% of the time, then during the next switching period keeping the transistors on for 55% of the time and keep them off for 45% of the time, such that an average of 50% is provided over two switching cycles.

However, such a sequence may result in a non-symmetric ripple which causes noise problems in many applications.

Accordingly, in some embodiments, a sequence is provided such that a symmetric ripple is generated, for example, through keeping transistors off first for 55% of the time, then after that, applying a 45% duty ratio, keeping the transistors on for 45% of the time, then, instead of turning off the transistors, keeping them on for 55% of the time, and after that, keeping them off for 45% of the time. The then sequence repeats, starting from 55% of the off time. In average over two cycles, the converter then provides a 50% average, but this time with symmetric ripple.

Duty Cycle Modulation and Inductor Current Ripple

The equation of the output inductor current ripple may be determined to evaluate and describe the performance of a proposed modulation method, according to some embodiments.

The maximum inductor current ripple may determine a size of an inductor. A three-level converter may exhibit maximum inductor current ripple at the D=0.25 and D=0.75 operating points. These operating characteristics may imply that zero-ripple operating point modulation can be applied in a method such that inductor current ripple is situated within boundaries defined by the worst case of a conventional modulation.

Some real-world applications can tolerate an increase in the inductor current ripple near the zero-ripple operating point, as long as the resultant ripple amplitude does not exceed the much larger maximum-ripple operation.

Inductor current ripple for duty-avoid modulation is given with following equation:

$$\Delta i_{Lp-p(DA)} = \frac{(1-2D_1)(D_1 + D_2)}{4 f_s L} V_{IN} \qquad (3)$$

It can be noted that the expected ripple is a function of two variables and that this function for any D1<0.5 and D2>0.5, the ripple of the duty-avoidance modulation is larger than that for the conventional case, i.e. $\Delta i_{Lp-p(DA)} > \Delta i_{Lp-p(Conv)} \approx 0$.

By applying duty cycle modulation at the D=0.5 conversion ratio, as it can be seen from FIG. 4, the inductor current ripple increases from a value close to zero for the conventional case to the value given by (3).

To avoid unwanted transients in the inductor current ripple, a dead-band region around the critical operating point where modulation may be applied is defined and an implementation method may be provided. The size of a dead-band region may depends on various regulation requirements and/or a maximum allowable ripple. The dead-band region may be pre-defined and/or selected based on an analysis of various specifications.

Example Implementation

The following section describes some illustrative examples of implementation of the controller, various control systems, and/or control methods. The examples are meant to be illustrative and non-limiting. Other variations having more, less, and/or different components and/or configurations may be possible.

Figure 6:
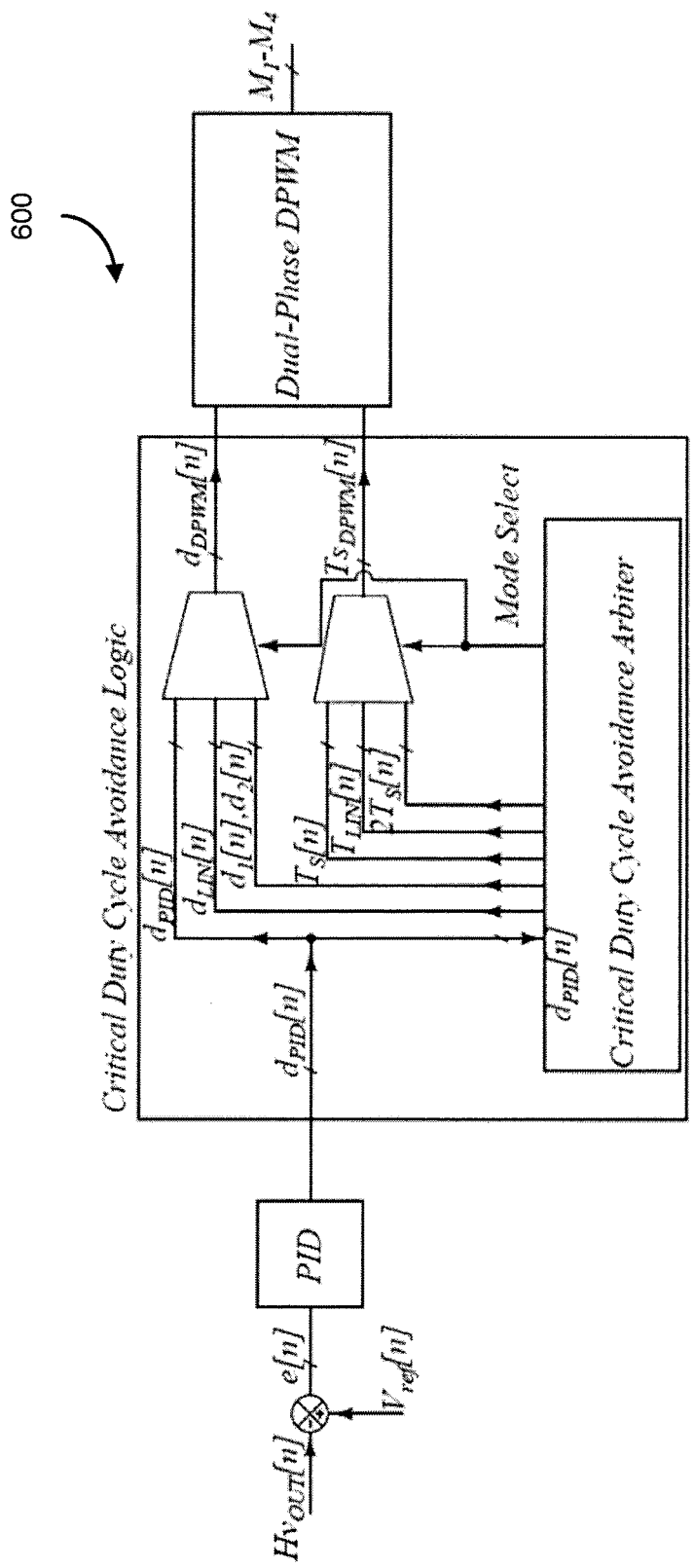
FIG. 6 is an example block schematic illustrating a digital implementation of the critical duty cycle avoidance controller, according to some embodiments.

A possible embodiment of critical duty cycle avoidance control method is depicted with block diagrams in FIG. 1 and FIG. 6. FIG. 6 is an example block schematic illustrating a digital implementation of the critical duty cycle avoidance controller, according to some embodiments.

The controller (e.g., a digital controller) may, in some embodiments, be provided as a modification of a standard digital voltage-mode pulse width-modulated (PWM) controller, where a conventional digital pulse-width modulator (DPWM) is replaced with a two-phase DPWM, to accommodate 4-switch operation.

In some embodiments, a controller may be provided as a specially configured pulse width-modulated (PWM) controller.

A module (e.g., a module configured for critical duty cycle avoidance) may be provided and/or added to a modulator. This module may provide for suppression of the switching spikes and implementation of the operating point avoidance modulation. The module may be configured for various modes of operation, and also the avoidance of one or more operating points and/or other operating characteristics through the application of various control methods and/or principles.

A principle of operation may be illustrated in FIG. 7, where the inductor current ripple for a potential system and a conventional 3-level buck are shown, according to some embodiments. The example is illustrative and not meant to be limiting. FIGS. 7A, 7B and 7C provide three different plots illustrating the dependence of the normalized inductor current on the conversion ratio value for critical duty cycle avoidance modulation, as provided across various modes of operation, according to some embodiments.

In some embodiments, the controller is configured to operate having multiple modes (e.g., two or three modes). Three different modes are described below, but there may be more, less, and/or different modes.

In an embodiment, the first two modes are necessary but the third mode is optional. In another embodiment, only the first two modes are provided. In yet another embodiment, all three modes are provided.

Example Operating Modes:
Mode 1—Conventional operation of the multi-level converter where duty ratio and switching frequency are not modified.
Mode 2—Zero-ripple operating point avoidance modulation, with constant switching frequency, where digital representations of duty cycle values at the input of multi-phase DPWM block are $d_1[n]=2d_{PID}[n]-d_2[n]$ and $d_2[n]=d_{const}[n]$.
Mode 3 (further enhancement)—This mode is used to smooth the transition between two switching frequencies characteristic for this system. In this mode the duty ratio is maintained the same as for conventional modulation while the switching frequency is gradually reduced from $f_s$ to $f_s/2$ (period linearly increased from $T_s$ to $2T_s$).

As illustrated in FIG. 6, based on the duty cycle value requested from the PID block, the critical duty cycle avoidance arbiter block may be configured for determining an operating region and may be configured to sets various values, such as $d_{DPWM}[n]$ and $T_{ADPWM}[n]$ values.

Mode 3 may be provided not only to smooth transitions between two switching frequencies but the operation of mode 3 may also reduce a difference in the ripple amplitude between regular and skip-modulation modes. For example, an operator of the system may select a dead-band region and operate it using Mode 3.

Effect of that difference reduction can be seen in FIG. 7B, where all three modes are utilized, compared to FIG. 7C, where only Mode 1 and Mode 2 are utilized.

Mode 3 is optional, and for applications where variable frequency is not preferable, Mode 3 can be omitted.

Mode 2, the region where zero-ripple operating point avoidance modulation is applied, is the region where $d_1[n]$ and $d_2[n]$ values are obtained. As mentioned earlier, there are two degrees of freedom for controlling the output voltage using critical duty cycle avoidance modulation method. Here, for simplicity in digital implementation, $d_2[n]$ is kept constant and $d_1[n]$ is calculated using equation (1), since, ideally, digital representation of conversion ratio is the value $d_{PID}[n]$.

In some embodiments, various hysteretic approaches may be utilized. For example, when the controller is issuing duty ratio values around 50%, it may require, in one cycle 51% and in the next cycle 50%. To avoid switching between duty ratio avoidance and conventional modes, a hysteretic controller may be utilized. The controller can switch into the duty ratio avoidance mode when the duty ratio is, for example between 49.5% and 50.5% but then use another mode when the duty ratio is between 47% and 53%. Accordingly, possible oscillations between the modes may be avoided.

In some embodiments, the controller may also be adapted to corrects for various variations, such as, and including, gate drive delays, level shift delays, and other real-world circuit implementation non-idealities to achieve desired duty ratios with non-overlapping switch operation. For example, in practical implementations, due to various losses, the actual duty ratio issued by the controller where there may be problems may not be at 50% but, rather at 51% or 52%. Accordingly, a realistic converter may need to be configured to recognize that even though 52% should not be a theoretical operating point with problems, there is a problem there (but not at the point where controller is issuing a 50% control variable). The controller may be, in some embodiments, configured to recognize those conditions in the case where there are imperfections in the circuit. Such a determination may be possible with addition of various types of other circuits, for example, a switching node monitoring circuit, or by identifying a sudden increase of duty ratio control, indicating various spikes (e.g., beyond a particular threshold) and losses (e.g., beyond a particular threshold).

Figure 11:
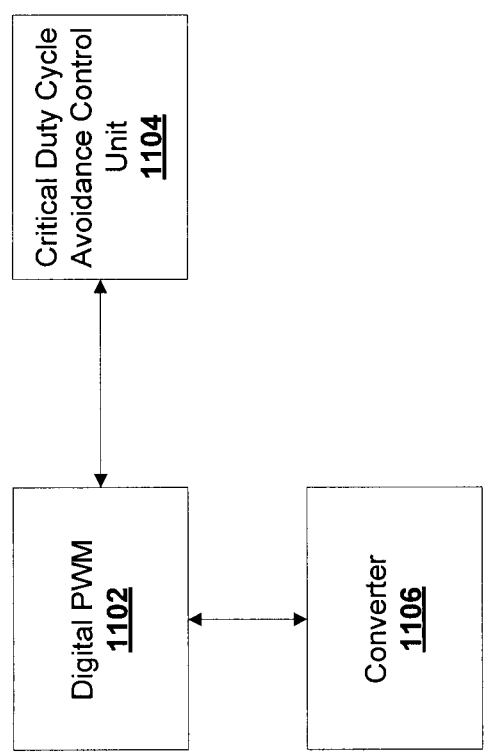
FIG. 11 is an example schematic diagram of conventional digital PWM being controlled by a critical duty cycle avoidance control unit, according to some embodiments.

FIG. 11 is an example schematic diagram of conventional digital PWM 1102 being controlled by a critical duty cycle avoidance control unit 1104, according to some embodiments. The digital PWM 1102 may be utilized to control the operation of converter 1106.

Figure 12:
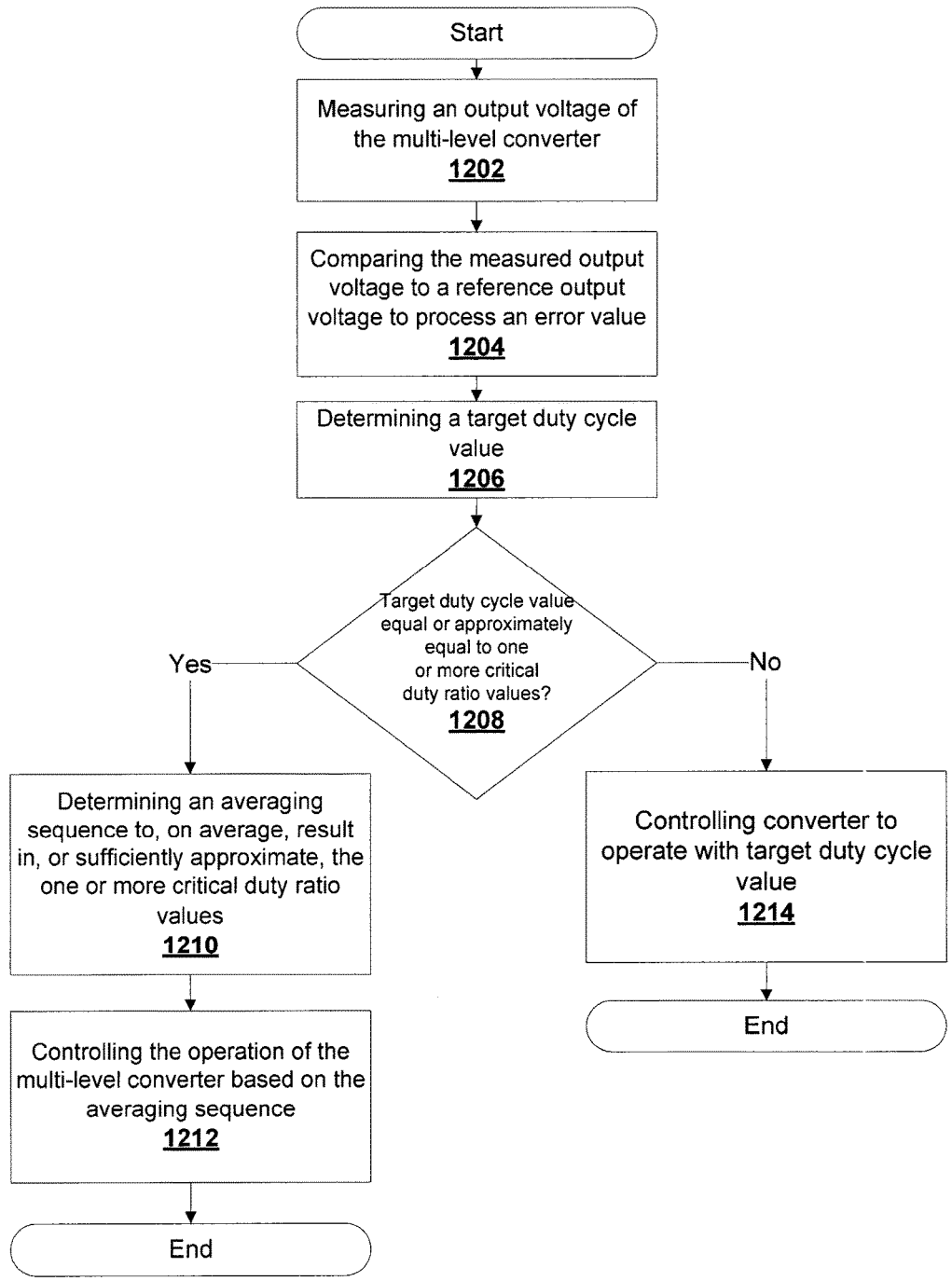
FIG. 12 is an example workflow diagram illustrating various steps that may be taken in performing a method, according to some embodiments.

FIG. 12 is an example workflow diagram illustrating various steps that may be taken in performing a method, according to some embodiments. As indicated in FIG. 12, the controller may be configured to perform various steps of a method, and the example steps shown are provided for illustration and are not meant to be limiting. For example, various other steps may be included and steps may be added, removed, modified, etc. At 1202, the controller may be configured for measuring an output voltage of the multi-level converter; at 1204, comparing the measured output voltage to a reference output voltage to process an error value associated with a difference between the measured output voltage and the reference output voltage; and at 1206, determining a target duty cycle value based at least on a control feedback loop mechanism adapted to minimize the error value.

If the target duty cycle value is equal or approximately equal to one or more critical duty ratio values, the controller, at 1210 may be configured for determining the operation of the multi-level converter to operate the multi-level converter with an averaging sequence, the averaging sequence adapted to, on average, result in, or sufficiently approximate, the one or more critical duty ratio values, but not operate at the one or more critical duty ratio values; and at 1212, controlling the operation of the multi-level converter based at least on the averaging sequence, (e.g., generating one or more pulse-width modulated signals to control the operation of the multi-level converter based on at least one of the target duty cycle and the averaging sequence).

If the target duty cycle value is not equal or approximately equal to one or more critical duty ratio values, the controller, at 1214 may be configured for operating the converter at the target duty cycle value.

Experimental Results

A low-power three-level buck converter has been built, based on the schematics of FIG. 1 and FIG. 6. The digital controller may be implemented with an FPGA based system, and the power stage has parameters given in Table I. Other types of technologies may also be utilized in its implementation. Performance was compared with a conventional voltage mode controller implemented with the same FPGA system. Table I is provided below:

TABLE I

Summary of Design Parameters

| Parameter | Value |
|---|---|
| $V_{IN}$ | 10 [V] |
| Conversion Ratio | 10%-90% |
| $I_{OUT}$ | 10 [mA]-3 [A] |
| fs (nominal) | 1 [MHz] |
| L | 470 [nH] |
| $C_{OUT}$ | 22 [µF] |
| $C_{FLY}$ | 4.7 [µF] |

To allow comparison with the conventional prototype without damage due to voltage transients, all transistors were overrated in terms of the blocking voltage.

Figure 8B:
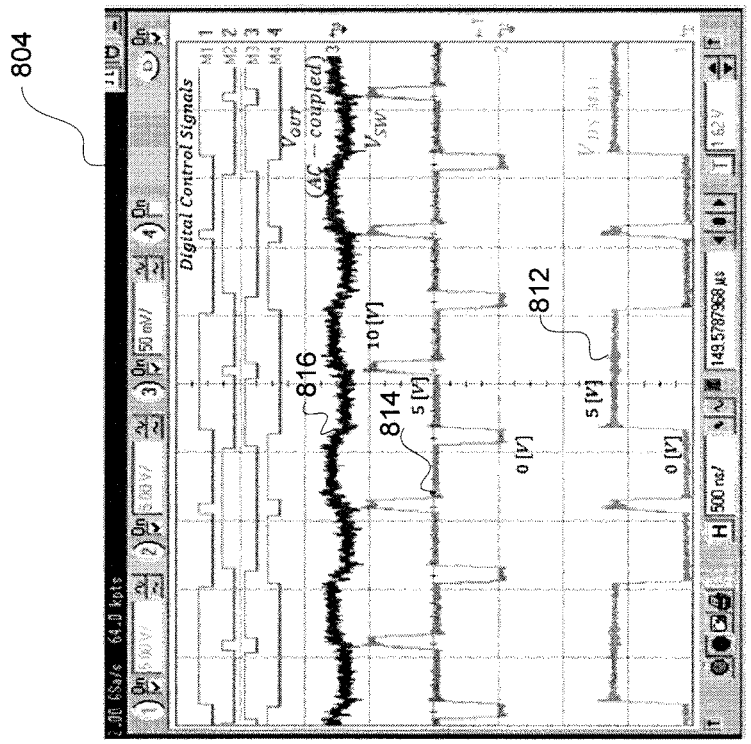
FIGS. 8A and 8B is a plot of key voltage waveforms of the converter for the conversion ratio M=1/2, according to some embodiments.
Figure 8A:
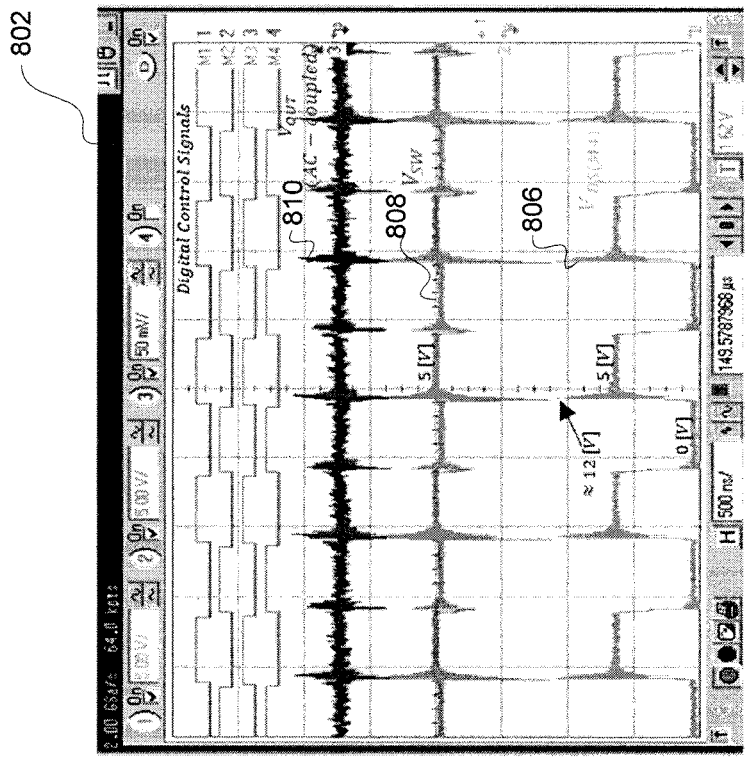

FIGS. 8A and 8B is a plot of key voltage waveforms of the converter for the conversion ratio M=1/2, according to some embodiments. The waveforms shown in FIG. 8A and FIG. 8B include: Ch1 806, 812. 5[V]/div: VDS4, Drain-source voltage of the low side M4 switch (FIG. 1.); Ch2 808, 814. 5[V]/div: VSW, switching node voltage, Ch3 810, 816. —AC coupled 50 [mV]/div: VOUT, output voltage of the converter; and Digital Probes 1-4: M1-M4 control signals (labelled as M1, M2, M3, and M4).

As it can be seen from FIG. 8A showing operation of the conventional controller for D≈0.5, significant voltage spikes may be present at the switching node resulting in large voltage stress. The results of FIG. 8B, showing operation of the converter controlled with operating point avoidance control method, indicate that the introduced method reduced and/or effectively eliminated the voltage spikes, enabling use of lower voltage rating transistors, and thereby realizing a benefit of multi-level converter topologies.

Another advantage of the proposed approach may be a reduction of output voltage noise, which would otherwise be caused by the large ringing at switching node when converter operates at a particular conversion ratio (e.g., D=0.5). A possible drawback of the operating point avoidance controller may be the introduction of a larger ripple at the output voltage, as indicated at FIG. 8B. However, it should be noted that the ripple amplitude during this mode of operation may still be smaller than that for the worst case operating points, corresponding to D=0.25 and D=0.75.

A linearity test was performed for both modes of operation (with and without operating point avoidance modulation), where a slow linear change of conversion ratio M(D) is done from D=0.25 to D=0.75 and the output voltage of the converter was recorded.

Figure 9B:
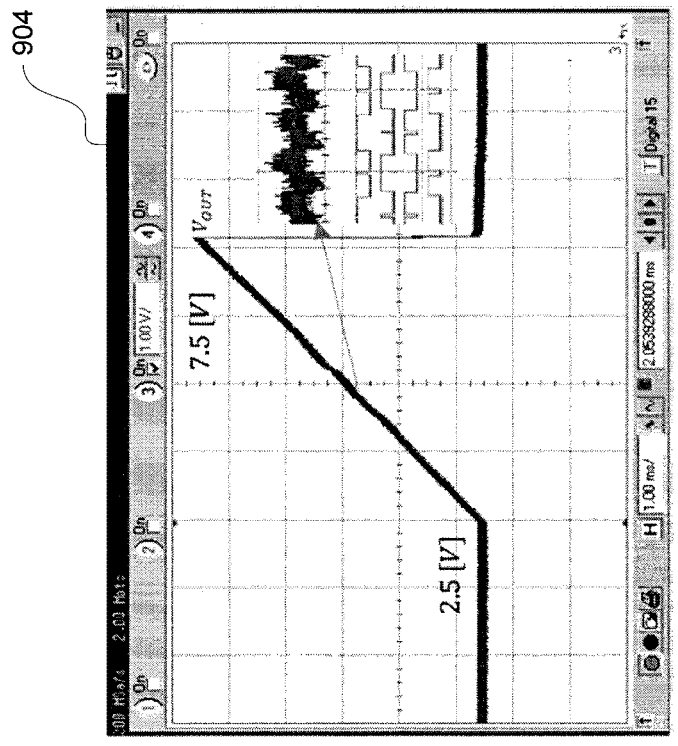
FIGS. 9A and 9B provide plots of sample output values related to of experimental three-level converter for gradual change of conversion ratio M from 0.25 to 0.75, according to some embodiments. Conventional modulation of the multi-level converters is shown in FIG. 9A and critical duty cycle avoidance modulation is applied in FIG. 9B.
Figure 9A:
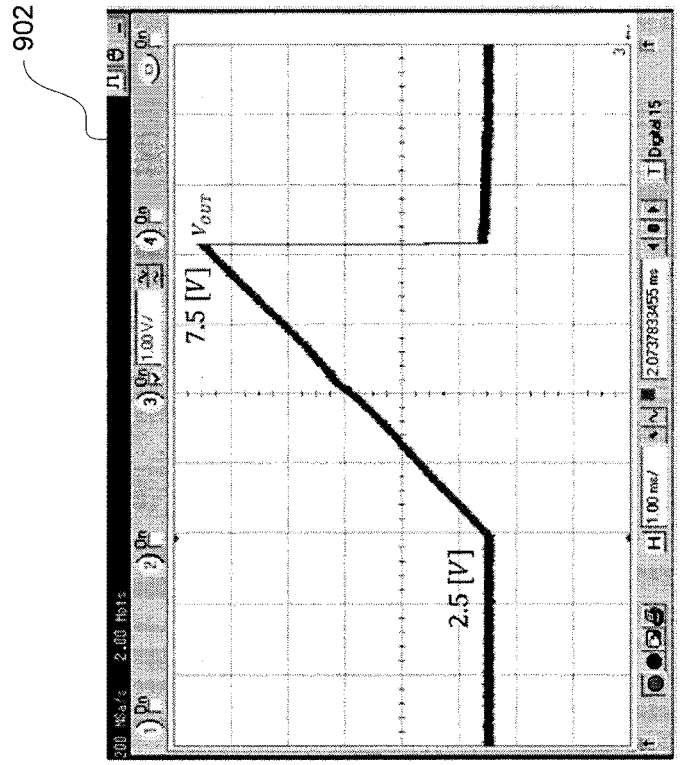

As it indicated in FIGS. 9A and 9B, there appears to be no significant difference in voltage transfer ratio between the conventional modulation method and the operating point avoidance method. FIGS. 9A and 9B provide plots of sample output values related to of experimental three-level converter for gradual change of conversion ratio M from 0.25 to 0.75, according to some embodiments. Conventional modulation of the multi-level converters is shown in FIG. 9A and critical duty cycle avoidance modulation is applied in FIG. 9B.

Figure 10:
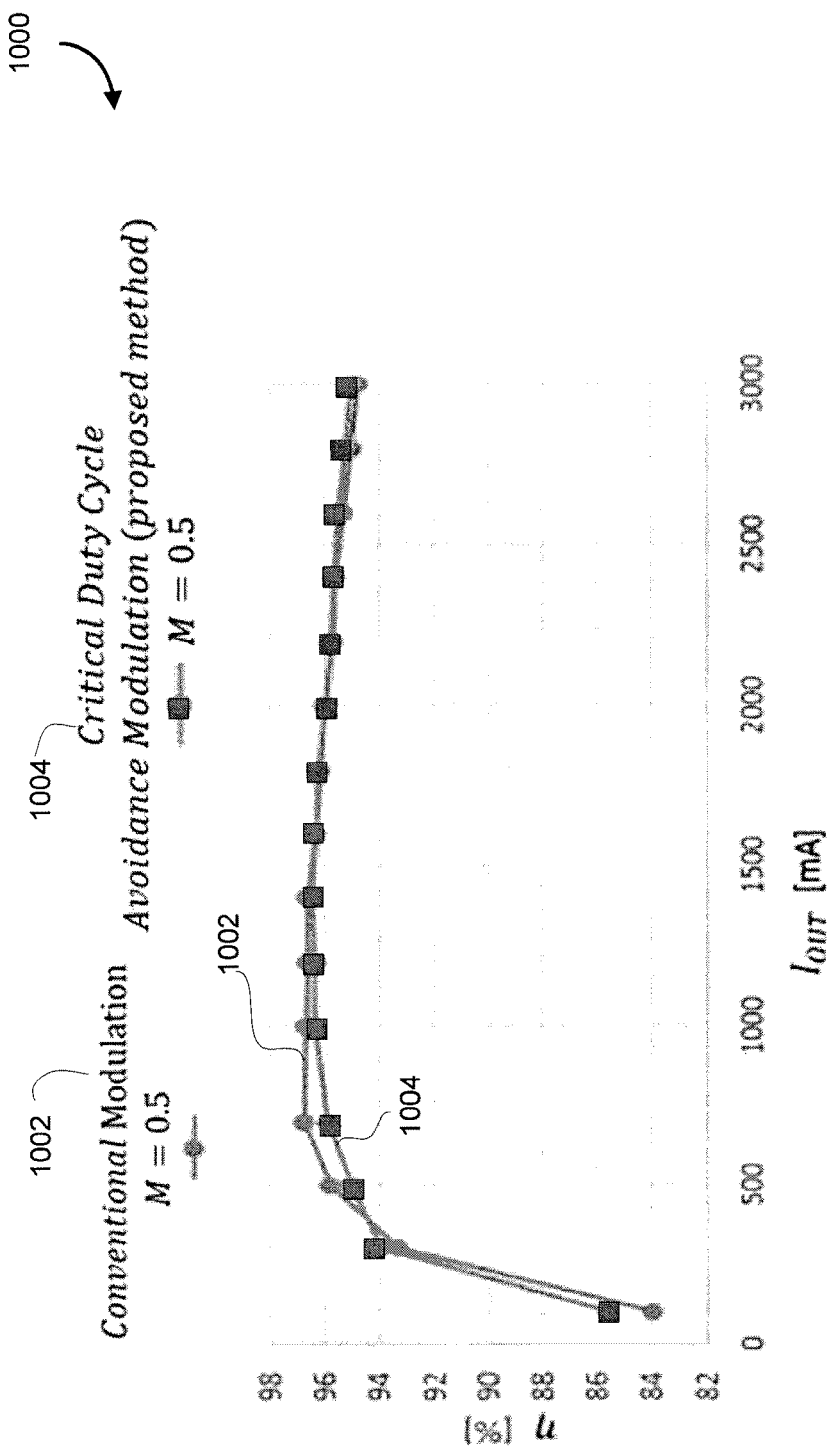
FIG. 10 is a curve plotting power processing efficiency results for both modes of operation for D=0.5, according to some embodiments.

FIG. 10 is a curve plotting power processing efficiency results for both modes of operation for D=0.5, according to some embodiments. The results show a minor reduction in the efficiency of the operating point avoidance modulation converter at the zero-ripple operating point compared to the conventional modulation method, due to a larger ripple current at the critical point.

In an optimized case, with the use of lower rating transistors allowed by the operating point avoidance method, a better efficiency than that of the conventional converter may be provided.

General

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface. These embodiments may be implemented on various types of computing devices and/or technologies, such as field programmable gate arrays (FPGAs).

Program code may be applied to input data to perform the functions described herein and to generate output information. The output information may be applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

The term "connected" or "coupled to" may include both direct coupling (in which two elements that are coupled to each other contact each other) and indirect coupling (in which at least one additional element is located between the two elements).

The technical solution of embodiments may be in the form of a software and/or firmware product configured for various control steps and/or methods. The software and/or firmware product may be stored in a non-volatile or non-transitory storage medium, which can be a compact disk read-only memory (CD-ROM), a USB flash disk, or a removable hard disk. The software and/or firmware product includes a number of instructions that enable an electronic device (personal computer, server, or network device) to execute the methods provided by the embodiments.

The embodiments described herein provide useful physical machines and particularly configured electronic hardware arrangements. The embodiments described herein are directed to electronic machines and methods implemented by electronic machines adapted for processing and transforming electromagnetic signals which represent various types of information.

The embodiments described herein pervasively and integrally relate to machines, and their uses; and the embodiments described herein have no meaning or practical applicability outside their use with electronic hardware, machines, and various hardware components. Substituting the physical hardware particularly configured to implement various acts for non-physical hardware, using mental steps for example, may substantially affect the way the embodiments work.

Such electronic hardware limitations are clearly essential elements of the embodiments described herein, and they cannot be omitted or substituted for mental means without having a material effect on the operation and structure of the embodiments described herein. The electronic hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A system configured to reduce voltage spikes across switches in a multi-level converter, the system comprising:
a first unit configured to measure an output voltage of the multi-level converter;
a second unit configured to compare a measured output voltage to a reference output voltage; and
a third unit configured to control the operation of the multi-level converter to operate the multi-level converter with an averaging sequence, the averaging sequence configured to, on average, result in, or sufficiently approximate, one or more critical duty ratio values, but not operate at the one or more critical duty ratio values, wherein the averaging sequence is based at least on an error value determined at least in part by a difference between the measured output voltage and the reference output voltage.

2. The system of claim 1, wherein the system is configured to conduct an automated circuit analysis to identify the one or more critical duty ratio values.

3. The system of claim 1, wherein the averaging sequence is configured to, during a first half of a switching cycle, change a switching node voltage from 0 to $V_{IN}/2$, and during a second half of the switching cycle, change the switching node voltage from $V_{IN}/2$ and $V_{IN}$.

4. The system of claim 1, wherein one or more dead-band regions are applied around each of the one or more critical duty ratio values, and wherein when a desired duty ratio falls within one of the one or more dead-band regions, the averaging sequence is applied or used to control the multi-level converter.

5. A system configured to reduce voltage spikes across switches in a multi-level converter, the system comprising:
a unit configured to control an operation of the multi-level converter to operate the multi-level converter with an averaging sequence, the averaging sequence being configured to, on average, result in, or sufficiently approximate, one or more critical duty ratio values, but not operate at the one or more critical duty ratio values, wherein the averaging sequence is based at least on an error value determined at least in part by a difference between a measured output voltage and a reference output voltage.

6. The system of claim 5, wherein the system is configured to conduct an automated circuit analysis to identify the one or more critical duty ratio values.

7. The system of claim 6, wherein the automated circuit analysis includes simulating the multi-level converter and approximating the one or more critical duty ratio values based at least on a number of levels in the multi-level converter.

8. The system of claim 6, wherein the automated circuit analysis includes processing of historical control information stored in a non-transitory machine-readable medium wherein the one or more critical duty ratio values are identified through approximations based at least on one of: circuit response, input characteristics, output characteristics, control parameters, and operating parameters.

9. The system of claim 5, wherein the unit is further configured to generate one or more pulse-width modulated signals, and wherein the one or more pulse-width modulated signals include control signals provided to four switches within the multi-level converter, the control signals controlling the switches to change states in accordance with the averaging sequence.

10. The system of claim 9, wherein the averaging sequence provides for dead-time adjustment during the operation of the multi-level converter when a target duty cycle value is equal or approximately equal to the one or more critical duty ratio values, thereby reducing a requirement for simultaneous control and reducing a number of shoot-through paths.

11. The system of claim 9, wherein the one or more pulse-width modulated signals are configured to issue simultaneous control signals to up to two switches of the four switches.

12. The system of claim 5, wherein one or more deadband regions are applied around each of the one or more critical duty ratio values, and wherein when a desired duty ratio falls within one of the one or more dead-band regions, the averaging sequence is applied or used to control the multi-level converter.

13. The system of claim 12, wherein the averaging sequence, during operation in the one or more dead-band regions, is configured for provisioning a transition smoothing mode wherein a switching frequency is gradually reduced from $f_s$ to $f_s/2$.

14. The system of claim 13, wherein a size of the one or more dead-band regions is determined based at least on a maximum allowable ripple.

15. The system of claim 5, wherein the averaging sequence is configured to, during a first half of a switching cycle, change a switching node voltage from 0 to $V_{IN}/2$, and during a second half of the switching cycle, change the switching node voltage from $V_{IN}/2$ and $V_{IN}$.

16. The system of claim 5, wherein the multi-level converter is configured to generate gating signals, where D is a desired duty cycle ratio, and the one or more critical duty ratio values includes D =0.5, the gating signals controlling operation of corresponding switches of the multi-level converter to provide the averaging sequence based at least on the difference between the measured output voltage and the reference output voltage.

17. A multiple mode controller that, for operating points substantially different from zero-ripple operating points, operates as a conventional controller, while in the vicinity of the zero-ripple operating points, operates using a duty cycle avoidance mode;
wherein the multiple mode controller is configured to control a multi-level converter in accordance with an averaging sequence, the averaging sequence being configured to, on average, result in, or sufficiently approximate, the zero-ripple operating points, but not operate at the zero-ripple operating points; and
wherein the duty cycle avoidance mode includes one or more modes being configured to smooth frequency or ripple transitions between conventional and avoidance modes of operation.

18. The multiple mode controller of claim 17, wherein the multiple mode controller is configured to operate in the duty cycle avoidance mode when a desired duty ratio is between a first duty ratio and a second duty ratio, and is configured to operate in a different mode when the desired duty ratio is beyond a range provided between the first duty ratio and the second duty ratio.

19. The multiple mode controller of claim 18, wherein the multiple mode controller is further configured to operate in a transition smoothing mode wherein a switching frequency is gradually reduced from $f_s$ to $f_s/2$.

20. The multiple mode controller of claim 19, wherein the multi-level converter is further configured to correct for variations in at least one of gate drive delays, level shift delays, and real-world circuit implementation non-idealities to achieve the desired duty ratio with non-overlapping switch operation.

* * * * *